(12) United States Patent
Tsumiyama

(10) Patent No.: US 7,228,756 B2
(45) Date of Patent: Jun. 12, 2007

(54) BICYCLE CONTROL DEVICE

(75) Inventor: Akira Tsumiyama, Sakai (JP)

(73) Assignee: Shimano Inc., Osaka (JP)

(*) Notice: Subject to any disclaimer, the term of this patent is extended or adjusted under 35 U.S.C. 154(b) by 572 days.

(21) Appl. No.: 10/720,267

(22) Filed: Nov. 25, 2003

(65) Prior Publication Data

US 2005/0109148 A1 May 26, 2005

(51) Int. Cl.
*F16C 1/10* (2006.01)

(52) U.S. Cl. ................................... 74/502.2

(58) Field of Classification Search .............. 74/500.5, 74/502.2, 489
See application file for complete search history.

(56) References Cited

U.S. PATENT DOCUMENTS

| | | | |
|---|---|---|---|
| 3,403,577 A | 10/1968 | Ozaki | |
| 3,720,111 A | 3/1973 | Guyton | |
| 3,861,234 A | 1/1975 | Cristie | |
| 4,304,145 A | 12/1981 | Shimano | |
| 4,462,267 A | 7/1984 | Shimano | |
| 4,716,782 A | 1/1988 | Jones | |
| 5,241,878 A | 9/1993 | Nagano | |
| 5,257,683 A | 11/1993 | Romano | |
| 5,299,466 A | 4/1994 | Heilbron et al. | |
| 5,303,608 A | 4/1994 | Iwasaki | |
| 5,325,735 A | 7/1994 | Nagano | |
| 5,400,675 A | 3/1995 | Nagano | |
| 5,429,012 A | 7/1995 | Ikeda et al. | |
| 5,479,776 A | 1/1996 | Romano | |
| 5,601,001 A | 2/1997 | Kawakami et al. | |
| 5,676,022 A | 10/1997 | Ose | |
| 5,768,945 A | 6/1998 | Ose | |
| 5,848,555 A | 12/1998 | Watarai | |
| 5,941,125 A | 8/1999 | Watarai et al. | |
| 6,095,010 A | 8/2000 | Arbeiter et al. | |
| 6,691,591 B2* | 2/2004 | Tsumiyama et al. | ....... 74/502.2 |
| 7,062,989 B2* | 6/2006 | Tsumiyama | ............... 74/502.2 |
| 7,100,471 B2* | 9/2006 | Irie et al. | ................... 74/502.2 |
| 2002/0139218 A1 | 10/2002 | Tsumiyama et al. | |
| 2002/0139637 A1 | 10/2002 | Tsumiyama et al. | |
| 2003/0094064 A1 | 5/2003 | Dal Pra' | |
| 2005/0022624 A1* | 2/2005 | Tsumiyama | ............... 74/502.2 |
| 2005/0109148 A1* | 5/2005 | Tsumiyama | ............... 74/502.2 |
| 2006/0207375 A1* | 9/2006 | Jordan et al. | ................. 74/489 |

FOREIGN PATENT DOCUMENTS

| | | |
|---|---|---|
| EP | 0 601 211 A1 | 6/1994 |
| EP | 0 849 157 A2 | 6/1998 |
| EP | 0 906 864 A2 | 4/1999 |
| EP | 1 342 654 A2 | 9/2003 |

* cited by examiner

*Primary Examiner*—Vicky A. Johnson
(74) *Attorney, Agent, or Firm*—Global IP Counselors, LLP

(57) ABSTRACT

A bicycle control device is provided to control both a derailleur and a brake device. The control device includes a mounting member, a control mechanism, a first lever portion and a second lever portion. The mounting member is coupled to part of the bicycle such as the handlebar. The control mechanism is coupled to the mounting member and is adapted to control braking and shifting. The first and second lever portions are operatively coupled to the control mechanism to perform braking/shifting. The first lever portion is arranged to perform braking and shifting. The second lever portion is arranged to at least perform shifting. The first and second lever portions are arranged to move together at least when operated to perform shifting.

18 Claims, 10 Drawing Sheets

BICYCLE CONTROL DEVICE

BACKGROUND OF THE INVENTION

1. Field of the Invention

This invention generally relates to a bicycle control device. More specifically, the present invention relates to a bicycle control device such as a combination shift/brake control device, which utilizes a pair of lever portions that are operable for controlling shifting.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In particular, control devices for braking and/or shifting have been extensively redesigned in recent years.

Generally, when riding a bicycle, it is desirable to be able to operate the brake control mechanism and the shift control mechanism of the bicycle quickly and easily while maintaining a firm grasp on the handlebar. Recently, control devices have been designed that utilize a single brake/shift lever to operate both a braking device and a shifting device of the bicycle.

An example of a bicycle control device with a single brake/shift lever is disclosed in U.S. Patent Application Publication No. US2002/0139637 (assigned to Shimano, Inc.). While this device works very well, the brake/shift lever of this device may not be optimal for all riders. In particular, this device can only be actuated when the rider's hand is in certain positions relative to the device. Thus, it can become difficult, inconvenient and/or uncomfortable for some riders who frequently change their hand positions while riding to actuate this device.

In view of the above, it will be apparent to those skilled in the art from this disclosure that there exists a need for an improved bicycle control device that overcomes the above mentioned problems in the prior art. This invention addresses this need in the art as well as other needs, which will become apparent to those skilled in the art from this disclosure.

SUMMARY OF THE INVENTION

One object of the present invention is to provide a bicycle control device with an ergonomic control lever that is comfortable and simple to operate during braking and gear shifting operations.

Another object of the present invention is to provide a bicycle control device that is relatively simple and inexpensive to manufacture and assemble.

Another object of the present invention is to provide a bicycle control device with a relatively lightweight yet relatively strong control lever.

Yet another object of the present invention is to provide a bicycle control device that includes a pair of lever portions that are operable for shifting.

The foregoing objects can basically be attained by providing a bicycle control device that comprises a mounting member, a control mechanism, a first lever portion and a second lever portion. The mounting member is adapted to be coupled to a bicycle. The control mechanism is coupled to the mounting member that is adapted to control braking and shifting. The first lever portion is operatively coupled to the control mechanism. The first lever portion is arranged to perform a braking operation upon a braking movement of the first lever portion and a first shifting operation upon a first shifting movement of the first lever portion. The second lever portion is operatively coupled to the control mechanism. The second lever portion is arranged to perform a second shifting operation upon a second shifting movement of the second lever portion. The first and second lever portions are arranged to move together when the first lever portion is operated to perform the first shifting operation and when the second lever portion is operated to perform the second shifting operation.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
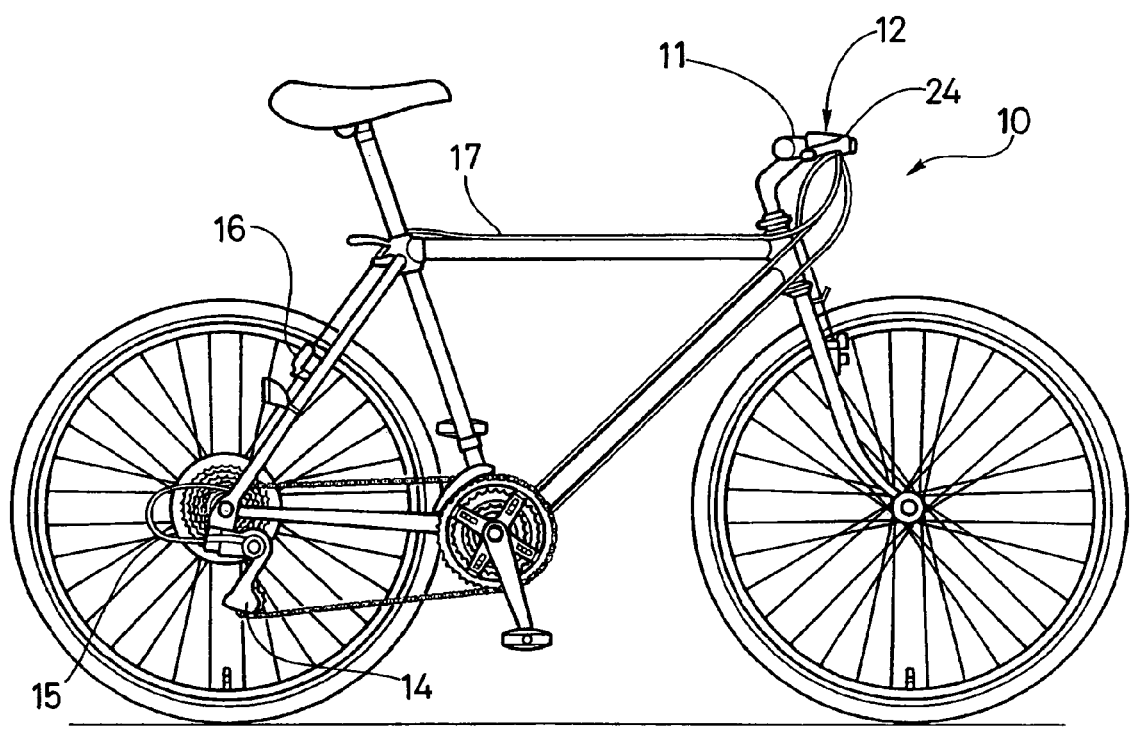
FIG. 1 is a side elevational view of a bicycle equipped with a control device having a control lever in accordance with a first embodiment of the present invention.
Figure 2:
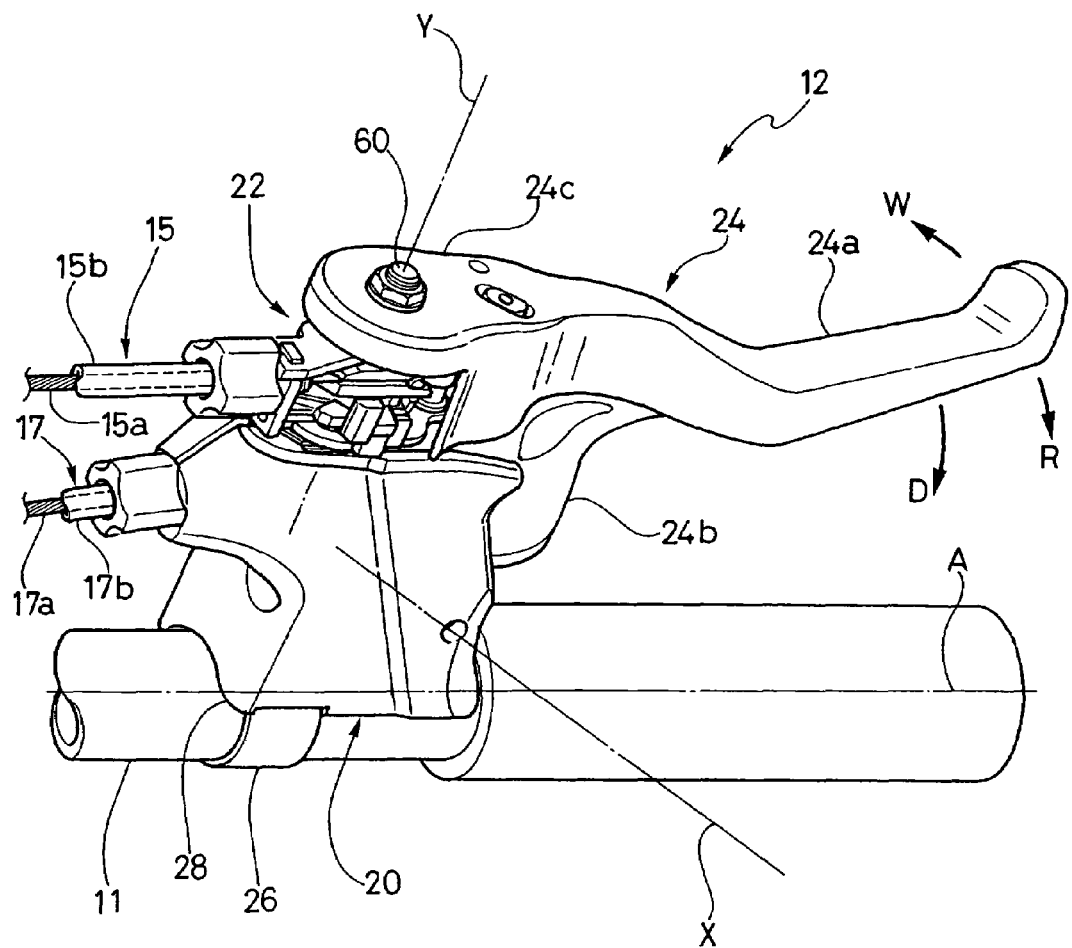
FIG. 2 is an enlarged perspective view of the bicycle control device illustrated in FIG. 1.
Figure 3:
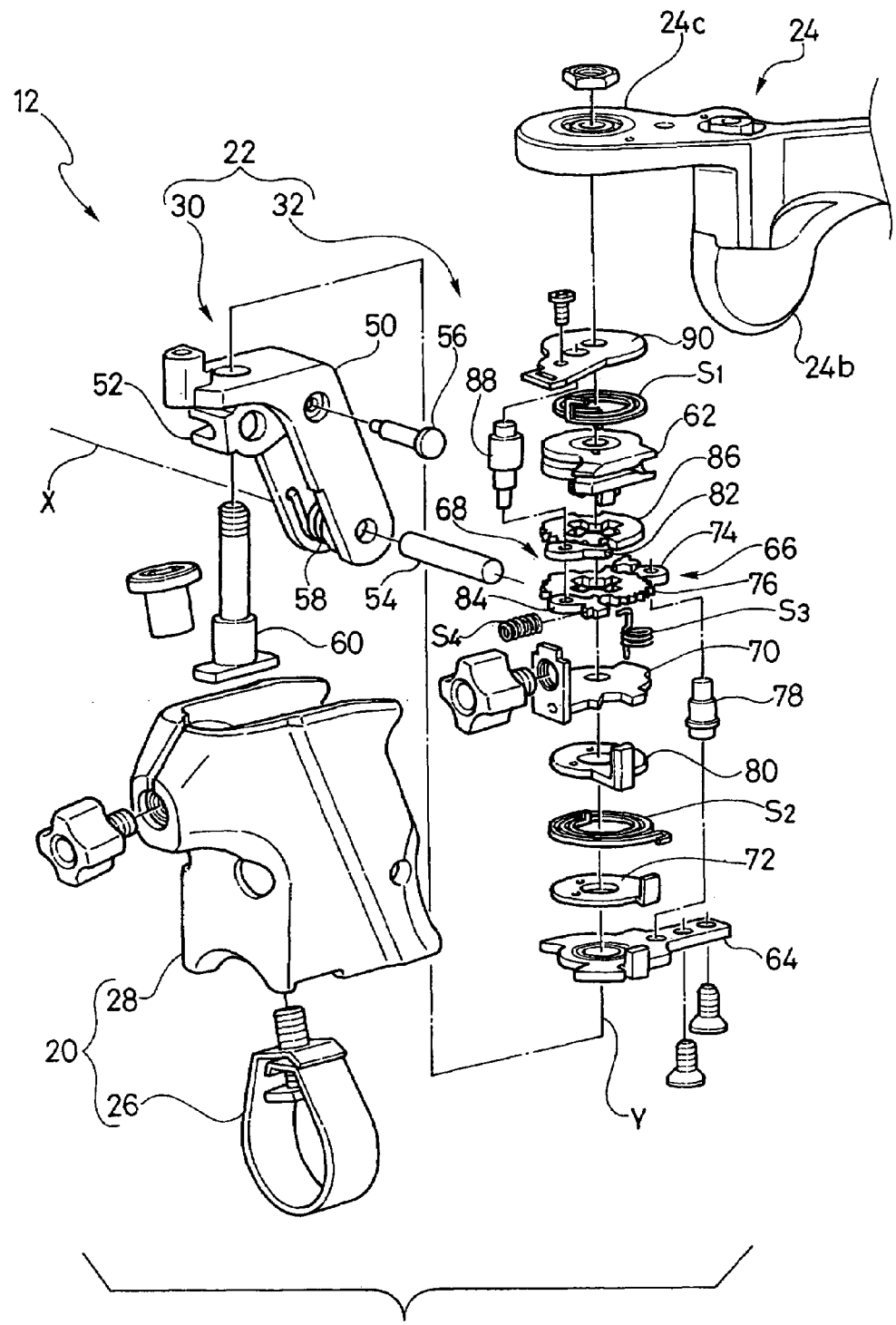
FIG. 3 is an exploded perspective view of the bicycle control device illustrated in FIG. 2.
Figure 4:
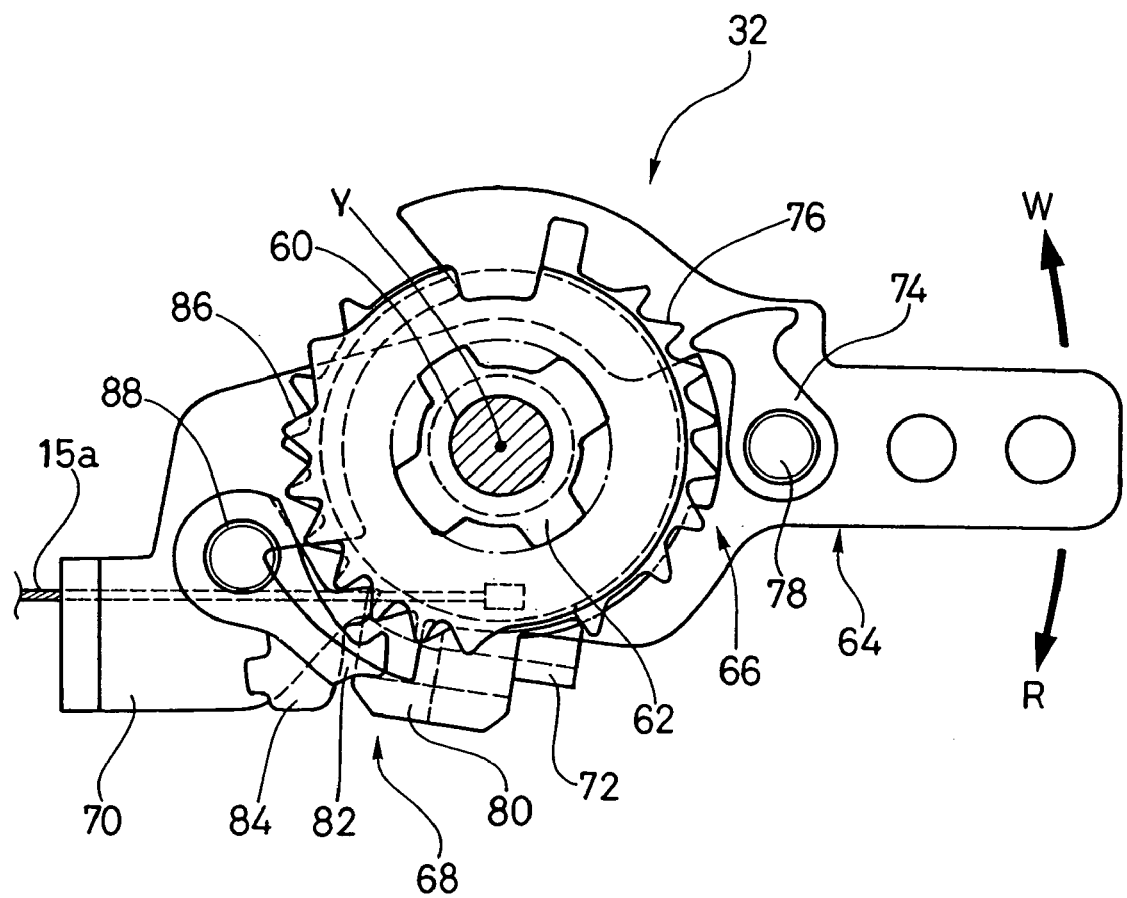
FIG. 4 is a partial, top plan view with selected parts removed for illustrating the operation of the shift control device of the bicycle control device illustrated in FIGS. 2–3.
Figure 5:
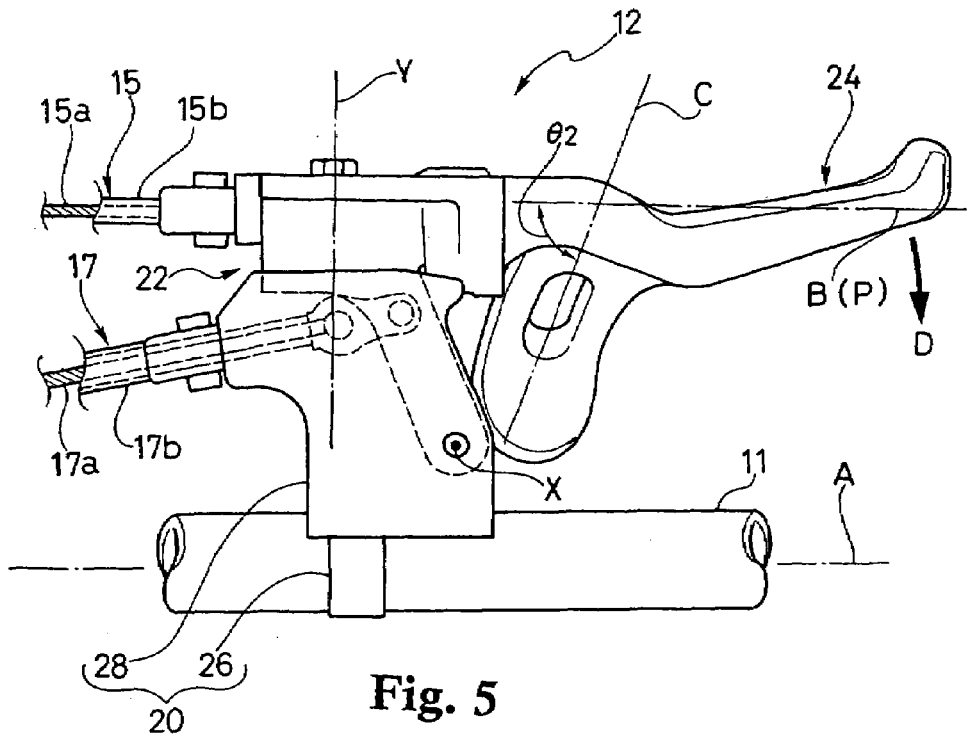
FIG. 5 is a substantially top plan view of the control device illustrated in FIGS. 1–3, with the control lever in the rest position and portions diagrammatically illustrated for the purpose of illustration.
Figure 6:
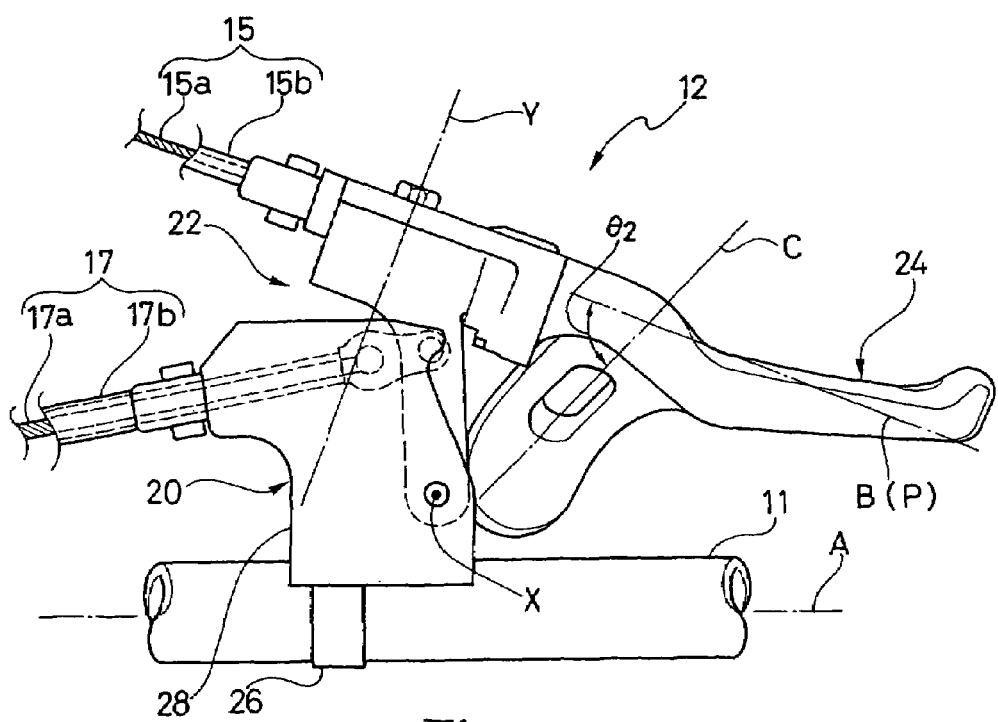
FIG. 6 is a substantially top plan view of the control device illustrated in FIGS. 1–3, with the control lever pivoted into the braking position and portions diagrammatically illustrated for the purpose of illustration.
Figure 7:
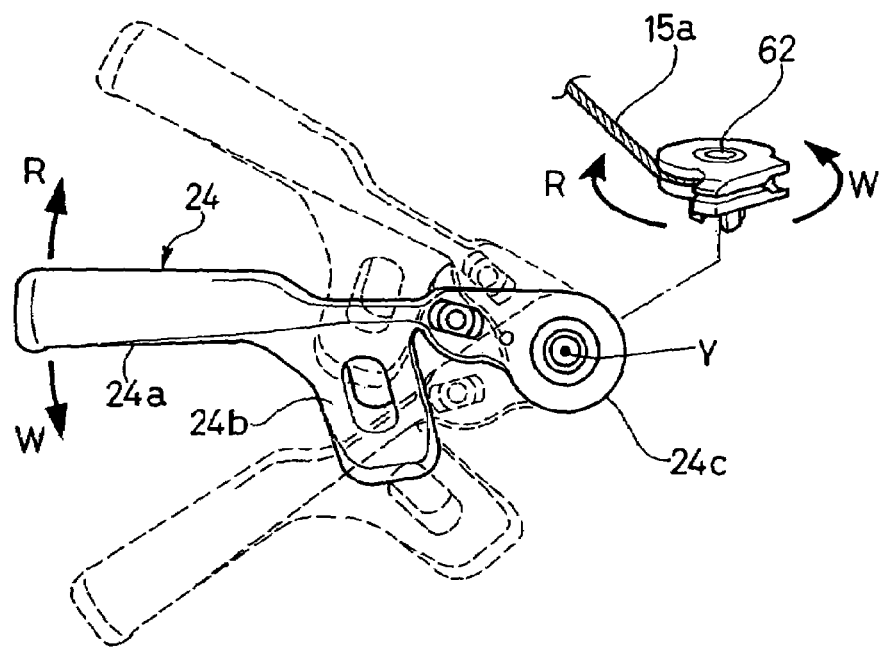
FIG. 7 is a front elevational view of the bicycle control device illustrated in FIGS. 1–6 showing the upper and lower shift positions of the control lever in broken lines, with portions removed for the purpose of illustration and with the winding member diagrammatically illustrated for the purpose of illustrating the winding and unwinding of the shift control cable.
Figure 8:
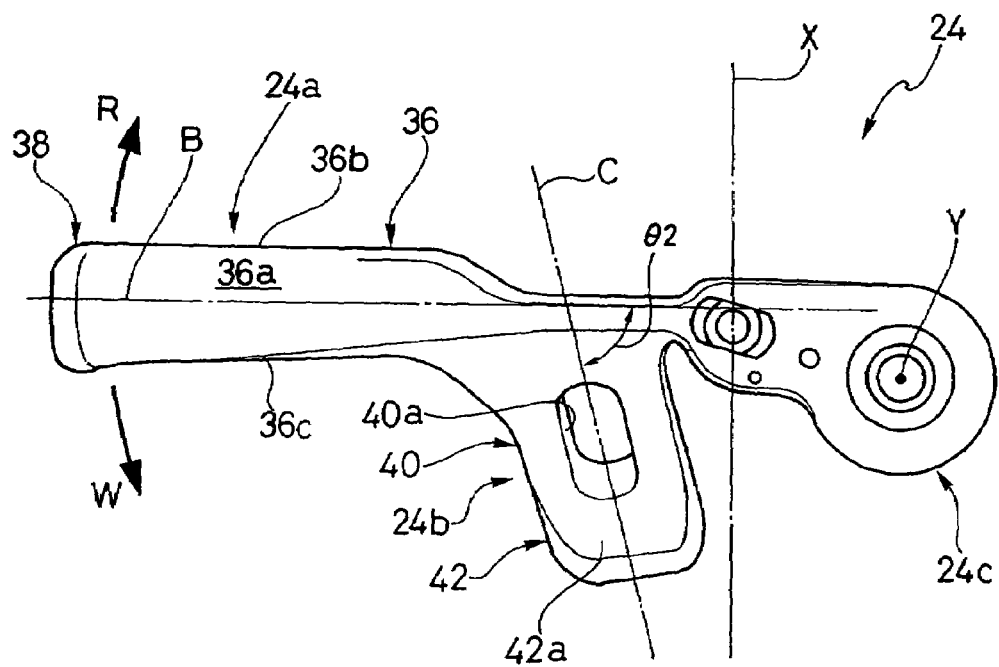
FIG. 8 is an enlarged front elevational view of the control lever of the bicycle control device illustrated in FIGS. 1–7.
Figure 9:
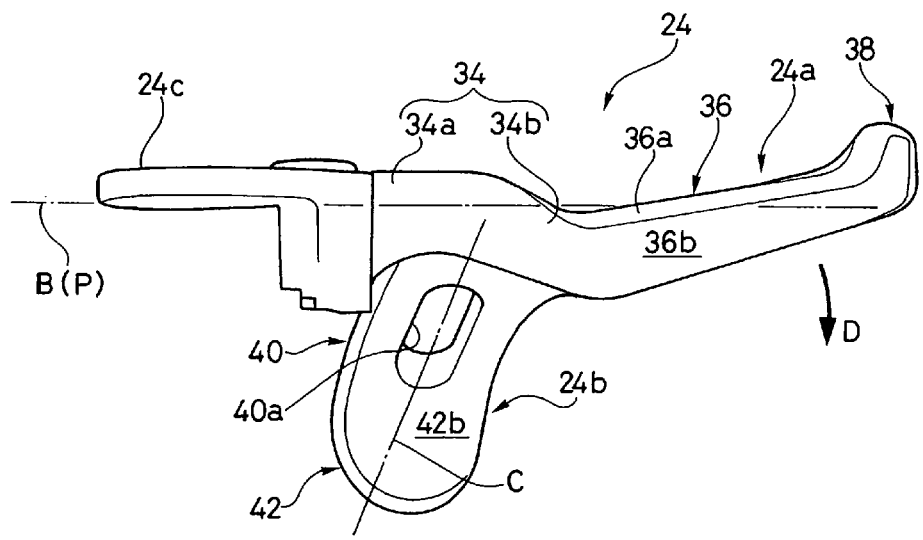
FIG. 9 is a top, plan view of the control lever illustrated in FIG. 8.
Figure 10:
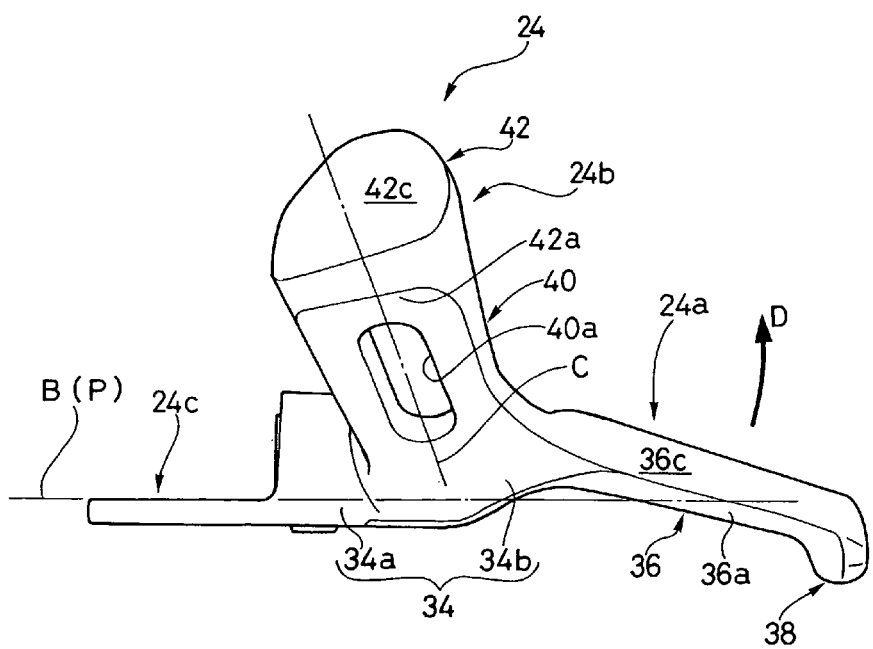
FIG. 10 is a bottom, plan view of the control lever illustrated in FIGS. 8 and 9.
Figure 11:
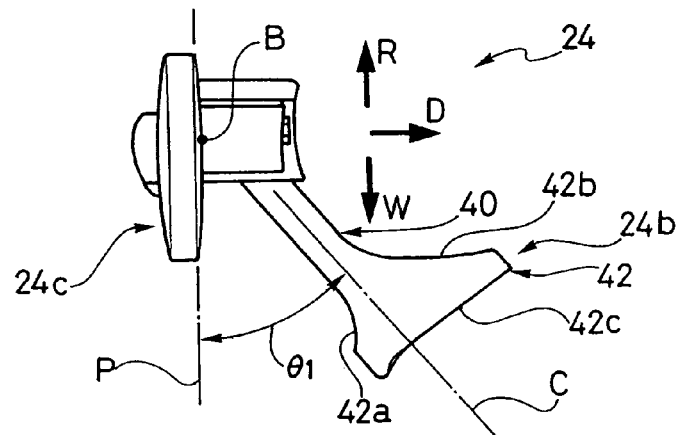
FIG. 11 is an inside, end elevational view of the control lever illustrated in FIGS. 8–10.
Figure 12:
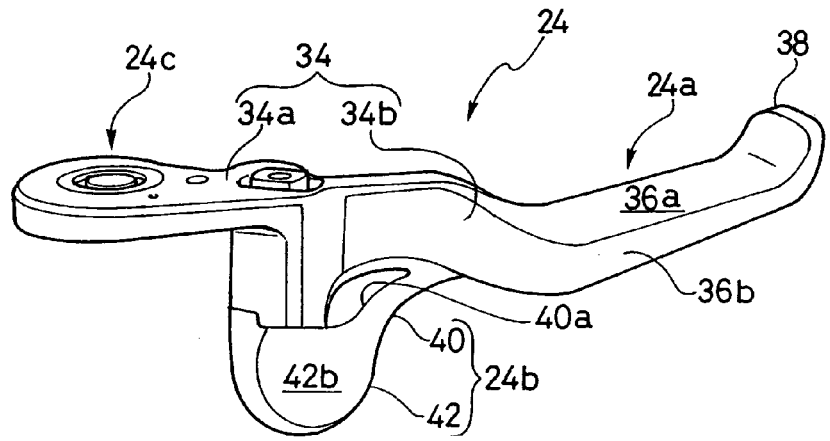
FIG. 12 is a top/front perspective view of the control lever illustrated in FIGS. 8–11.
Figure 13:
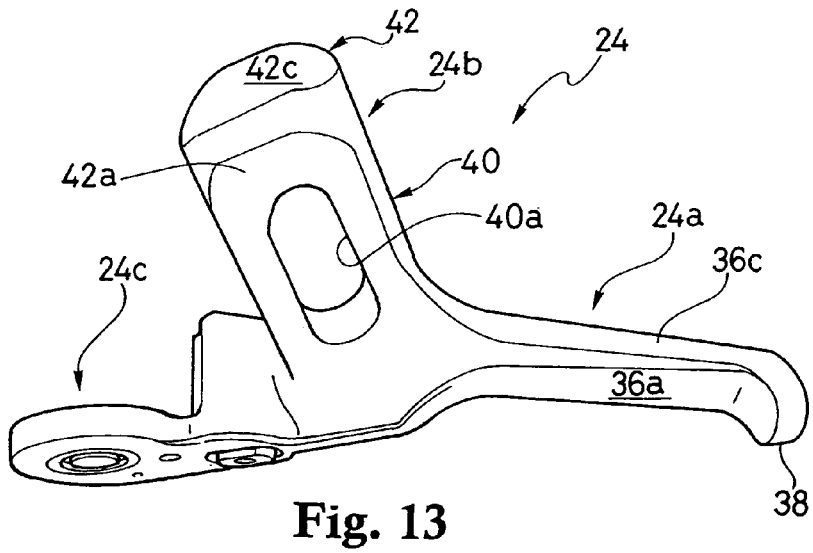
FIG. 13 is a bottom/front perspective view of the control lever illustrated in FIGS. 8–12.

Referring initially to FIGS. 1 and 2, a bicycle 10 is illustrated with a bicycle control device 12 in accordance with a first embodiment of the present invention. The bicycle control device 12 is configured and arranged to include first and second user operable lever portions 24a and 24b in accordance with the present invention that are utilized by the rider to control braking and shifting, as explained in more detail below. The bicycle control device 12 is preferably coupled to a handlebar 11 of the bicycle 10. The bicycle control device 12 is a right hand side control device 12 designed to be operated by the rider's right hand to control a rear derailleur 14 via a rear shift control cable 15 and a rear brake device 16 via a rear brake control cable 17. The control cable 15 includes an inner wire 15a and an outer casing or sheath 15b, while the control cable 17 includes an inner wire 17a and an outer casing or sheath 17b.

Preferably, the bicycle 10 includes a left hand side bicycle control device (not shown) in accordance with the present invention. The left hand side control device (not shown) is substantially identical to the bicycle control device 12 in order to control the front derailleur and the front brake device in a manner substantially identical to the rear (right hand side) control device. In particular, the left hand side bicycle control device (not shown) is essentially identical in construction and operation to the control device 12, except that it is a mirror image of the control device 12 and the number of shift positions for the left hand side bicycle control device (not shown) is different. For example, the left hand side control device (not shown) can be designed with two or three shift positions. Thus, only the control device 12 will be discussed and illustrated herein.

The various parts of the bicycle 10 are conventional, except for the bicycle control device 12, as discussed below. Thus, the remaining parts of the bicycle 10 will not be discussed or illustrated in detail herein, except as they relate to the bicycle control device 12. Rather, it will be apparent to those skilled in the art from this disclosure that various conventional bicycle parts such as brakes, additional sprockets, derailleurs, etc., which are not illustrated and/or discussed in detail herein, can be used in conjunction with the present invention. Moreover, it will be apparent to those skilled in the art from this disclosure that various modifications can be made to the various components or parts of the bicycle 10 without departing from the scope of the present invention.

As used herein, the following directional terms "forward, rearward, above, downward, vertical, horizontal, below and transverse" as well as any other similar directional terms refer to those directions of a bicycle equipped with the present invention in its normal riding position. Accordingly, these terms, as utilized to describe the present invention should be interpreted relative to a bicycle equipped with the present invention in its normal riding position.

Referring to FIGS. 1–7, the bicycle control device 12 will now be explained in more detail. The bicycle control device 12 basically includes a mounting portion 20, a control mechanism 22 and a control lever 24. The control mechanism 22 is coupled to the mounting portion 20. In particular, parts of the control mechanism 22 are movable coupled to the mounting portion 20 to pull/release the rear shift control cable 15 and the rear brake control cable 17 to perform shifting and braking operations, respectively. The control lever 24 is operatively coupled to the control mechanism 22 to perform the shifting and braking operations upon moving the control lever 24 in certain directions, as explained below.

The control device 12 of the present invention basically functions in the same manner as described and illustrated in U.S. Patent Publication No. US2002/0139637 assigned to Shimano, Inc. (U.S. Pat. No. 6,647,823), except that the shape of the control lever 24 operable for braking and/or shifting has been changed in accordance with the present invention. Moreover, the parts of the control device 12 are identical to the control device described and illustrated in U.S. Patent Publication No. US2002/0139637 assigned to Shimano, Inc. (U.S. Pat. No. 6,647,823), except for the control lever 24. Thus, the control device 12 of the present invention will not be discussed and/or illustrated in detail herein. Rather, the control device 12 will only be discussed and illustrated in sufficient detail to make and use the present invention.

Referring still to FIGS. 1–7, the mounting portion 20 basically includes a tubular clamping member 26 and a lever support member 28. The tubular clamping member 24 is fixedly coupled to the handlebar 11 in a conventional manner. The lever support member 28 is fixedly coupled to the tubular clamping member 26 such that the lever support member 28 is non-movably fixed to the handlebar 11. In this embodiment, the bicycle handlebar 11 is a conventional flat-bar type handlebar having a cylindrical tubular body that extends substantially along a handlebar axis A that is transverse to the longitudinal center plane (not shown) of the bicycle 10. When the mounting portion 20 is fixedly coupled to the handlebar 11, the lever support portion 28 preferably extends in a forward direction relative to the handlebar 11. Of course, it will be apparent to those skilled in the art from this disclosure that the precise orientation of the lever support portion 28 will depend on the preferences of the rider. Of course, it will be apparent to those skilled in the art from this disclosure that the control device 12 of the present invention can be mounted on other types of handlebars as needed and/or desired.

The control mechanism 22 is arranged and configured to operate/control cable actuated bicycle components (i.e., the rear derailleur 14 and the rear brake device 16) upon moving the control lever 24 in certain directions. Specifically, the control mechanism 22 basically includes a brake control mechanism 30 that performs the braking operation and a shift control mechanism 32 that performs the shifting operations. The inner wire 15a of the shift control cable 15 is operatively coupled to the shift control mechanism 32, while the inner wire 17a of the brake control cable 17 is operatively coupled to the brake control mechanism 30. The control mechanism 22 will be explained in more detail below.

Referring now to FIGS. 1–13, the control lever 24 will now be discussed in more detail. The rider moves the control lever 24 in a substantially rearward direction D in order to actuate the brake control mechanism 30. On the other hand, the rider moves the control lever 24 in substantially upward and downward directions R and W, respectively to actuate the shift control mechanism 32. When the control lever 24 is moved in the direction D, the braking operation (i.e., pulling the inner wire 17a) is preformed. When the control lever 24 is moved in the direction W, one shifting operation is performed (i.e., pulling the inner wire 15a). When the control lever 24 is moved in the direction R, another shifting operation is performed (i.e., releasing the inner wire 15a).

More specifically, the control lever 24 is pivoted about a brake pivot axis X in the direction D from a brake rest position to a braking position to operate the rear brake device 16 via the brake control mechanism 30, while the control lever 24 is pivoted from a neutral shift position to upper and lower shift positions about a shift pivot axis Y to operate the rear derailleur 14 via the shift control mechanism 32. The control lever 24 is moved in the upper and lower directions R and W when the control lever 24 is moved to the upper and lower shift positions, respectively. The shift pivot axis Y is substantially perpendicular to the brake pivot axis X. During a braking operation, the neutral shift position (and the shift pivot axis Y rotates) moves such that the rider can shift and brake at the same time.

In the illustrated embodiment, the bicycle control device 12 is arranged and configured such that a rider views the bicycle control device 12 while sitting on the bicycle 10 and gripping the bicycle handlebar 11. From this viewpoint, the brake pivot axis X preferably extends in a substantially vertical direction, while the shift pivot axis Y extends substantially longitudinally (i.e., from front to back) relative to the bicycle 10. However, it will be apparent to those skilled in the art from this disclosure that precise orientations of the brake pivot axis X and the shift pivot axis Y relative to the vertical and horizontal planes will depend on the orientation of the mounting portion 20, which in turn depends on the preferences of the rider. In any case, the shift pivot axis Y is preferably perpendicular to the brake pivot axis X.

Referring to FIGS. 5–13, the control lever 24 basically includes the first lever portion 24a, the second lever portion 24b, and an attachment portion 24c. The control lever 24 is preferably constructed of a lightweight, rigid, material such as a metallic material. The attachment portion 24c is arranged and configured to be coupled to the control mechanism 22. The first lever portion 24a extends outwardly from the attachment portion 24c. The second lever portion 24b preferably extends outward from the first lever portion 24a at an angle.

Preferably, the first lever portion 24a is a contoured lever that generally lies along a first longitudinal axis B extending through a shifting plane P of the rear surface of the attachment portion 24c to the free end of the lever portion 24a. The first longitudinal axis B is substantially perpendicular to the brake pivot axis X and substantially perpendicular to the shift pivot axis Y. The second lever portion 24b generally lies along a second longitudinal axis C that is angled relative to the first longitudinal axis B. In particular, the second longitudinal axis C is angled downwardly and rearwardly from the shifting plane P by an angle $\theta_1$ of about 40°. Also, the second longitudinal axis C is angled inwardly relative to the axis B by an angle of $\theta_2$ of about 75°. The second lever portion 24b is arranged and configured to be operable by the rider in a different way from the first lever portion 24a, as explained below in more detail.

In this embodiment, the first lever portion 24a, the second lever portion 24b and the attachment portion 24c are preferably integrally formed together as a one-piece, unitary member. However, it will be apparent to those skilled in the art from this disclosure that the first lever portion 24a, the second lever portion 24b and the attachment portion 24c could be constructed as separate member as needed and/or desired. For example, the second lever portion 24b could be constructed as a separate member from the first lever portion 24a and the attachment portion 24c, as discussed below with reference to another preferred embodiment of the present invention.

Moreover, it will be apparent to those skilled in the art from this disclosure that control lever 24 could have other configurations as needed and/or desired. For example, the control lever 24 could be constructed with several additional different lever portions instead of the second lever portion 24b, as discussed below in reference to another preferred embodiment of the present invention. In any case, the parts of the control lever 24 are preferably fixedly, non-movable coupled together.

Referring still to FIGS. 5–13, the first lever portion 24a basically includes an attachment section 34, a first actuation section 36 and a free end section 38. The attachment section 34 includes a pivot plate or section 34a and a bent section 34b that is arranged such that the first actuations section 36 is slightly angled relative to the longitudinal axis B of the first lever portion 24a as viewed along the shifting plane P. The second lever portion 24b is formed with the attachment section 34. The (first) actuation section 36 includes a brake actuating surface 36a, a first upper shift surface 36b and a first lower shift surface 36c. The (first) actuation section 36 is a substantially straight section that is arranged between the attachment section 34 and the free end section 38.

The brake actuating surface 36a is preferably a substantially vertical surface, while the upper shift surface 36b is preferably a substantially horizontal surface substantially perpendicular to the brake actuating surface 36a. The lower shift surface 36c is preferably angled relative to both the brake actuating surface 36a and the upper shift surface 36b such that the lower shift surface 36c faces substantially downwardly and rearwardly. The actuation section 36 preferably has longitudinal dimension sufficient to contact at least one finger of the rider in a conventional manner. More specifically, the actuation (first) section 36 preferably has a transverse dimension sufficient to contact a pair of fingers of the rider such as both the index and middle fingers of the rider.

The rider pushes on the brake actuating surface 36a to move or pivot the first lever portion 24a in the direction D (i.e., a braking movement of the first lever portion 24a) about the pivot axis X to perform the braking operation (i.e., pulling the inner wire 17a). The rider pushes on the upper shift surface 36b to move or pivot the first lever portion 24a in the direction W (i.e., a shifting movement of the first lever portion 24a) about the pivot axis Y to perform one shifting operation (i.e., pulling the inner wire 15a). The rider pushes on the lower shift surface 36c to move or pivot the first lever portion 24a in the direction R (i.e., a shifting movement of the first lever portion 24a) about the pivot axis Y to perform another shifting operation (i.e., releasing the inner wire 15a). The braking/shifting movements and operations will be discussed in further detail below.

In the illustrated embodiment, the second lever portion 24b extends downwardly and rearwardly from the first lever portion 24a. Also, the second lever portion 24b preferably extends slightly inwardly toward the center plane of the bicycle 10 when the control device 12 is coupled to the handlebar 11 and the bicycle 10 is in its normal riding position. The second lever portion 24b basically includes an extending section 40 and a second enlarged actuation section 42. The extending section 40 extends along the longitudinal axis C from the attachment section 34 of the first lever portion 24a to the (second) actuation section 42. The extending section 40 has a longitudinal cutout 40a for weight reduction. The (second) actuation section 42 includes a front contact surface 42a, second upper shift surface 42b and a second lower shift surface 42c. The second lever portion 24b is preferably at least half as long as the actuation section 36 of the first lever portion 24a such that the second actuation section 42 is sufficiently space from the first lever portion 24a to provide a different shifting movement for the rider.

The (second) upper shift surface 42b is preferably a curved surface that faces substantially upwardly, while the (second) lower shift surface 42c is preferably a curved surface that faces substantially downwardly and rearwardly. The (second) upper shift surface 42b is preferably contoured to be operable by the rider's finger such as the index finger to move the control lever 24 downwardly in the direction W about the shift pivot axis Y. On the other hand, the (second) lower shift surface 42c preferably has a larger contour than the (second) upper shift surface 42b so as to be easily operable by the rider's thumb to move the control lever 24 upwardly in the direction R about the shift pivot axis Y.

The rider pushes on the upper shift surface 42b to move the second lever portion 24b in the direction W (i.e., a shifting movement of the second lever portion 24b) to perform one shifting operation (i.e., pulling the inner wire 15a). The rider pushes on the lower shift surface 42c to move the second lever portion 24b in the direction R (i.e., a shifting movement of the second lever portion 24b) to perform another shifting operation (i.e., releasing the inner wire 15a). The braking/shifting movements and operations will be discussed in further detail below.

For the sake of clarity, the brake pivot axis X is illustrated as being substantially vertical and the shift pivot axis Y is illustrated as being substantially horizontal. However, it will be apparent to those skilled in the art from this disclosure that the orientations of the axes X and Y will depend on the desired shifting/braking movement preferences of the rider. The shift pivot axis Y is preferably angled less than about forty-five degrees relative to a horizontal plane (i.e., the ground). Thus, the brake pivot axis X is preferably angled less than about forty-five degrees relative to a vertical plane perpendicular to the ground. In any case, the control device 12 is preferably arranged and configured to provide alternate ways of moving the control lever 24 between the neutral shift position and the upper and lower shift positions by using the first lever portion 24a and the second lever portion 24b.

Referring again to FIGS. 1–7, the brake control mechanism 30 will now be discussed in more detail. As mentioned above, the brake control mechanism 30 is arranged and configured to actuate the brake control cable 17 to operate the rear brake device 16. The brake control mechanism 30 basically includes a brake lever base 50, a cable hook or brake cable attachment portion 52, a pivot pin 54, a cable attachment pin 56 and a biasing member (torsion spring) 58. The brake lever base 50 is pivotally coupled to the lever support member 28 via the pivot pin 54. The cable attachment portion 52 is pivotally coupled to the brake lever base 50 via the cable attachment pin 56. The inner wire 17a of the control cable 17 is coupled to the cable attachment portion 52 in a conventional manner (e.g., by a nipple or the like). The biasing member 58 is mounted on the pivot pin 54 and operatively coupled between the brake lever base 50 and the lever support member 28 to normally bias the brake lever base 50 towards the rest position.

The control lever 24 is coupled to the brake lever base 50 to move with the brake lever base 50 about the brake pivot axis X. Thus, the control lever 24 is normally biased toward the rest position by the biasing member 58. Thus, when the control lever 24 is moved from the rest position toward the handlebar 11 against the biasing force of the spring 58, the inner wire 17a is pulled to actuate the rear brake device 16. In other words, moving the first lever portion 24a in the direction D toward the handlebar 11 (i.e. a braking movement) performs a braking operation (i.e., pulling the inner wire 17a). When the first lever portion 24a is released, the control lever 24 moves back to the brake rest position.

Referring still to FIGS. 1–7, the shift control mechanism 32 will now be briefly discussed in more detail. The shift control mechanism 32 is arranged and configured to pull and release the shift control cable 14 (perform shifting operations) to operate the rear derailleur 14, as mentioned above. The shift control mechanism 32 basically includes a pivot shaft 60, a winding member 62, an operating plate 64, a winding mechanism 66, a hold and release mechanism 68 and a fixed plate 70.

The pivot shaft 60 is fixedly coupled to the brake lever base 50. The center of the pivot shaft 60 corresponds to the shift pivot axis Y. The winding member 62 is rotatably supported on the pivot shaft 60. The winding member 62 is normally biased in the direction R by a spring $S_1$. The inner wire 15a is coupled to the winding member 62 in a conventional manner (i.e., via a nipple or the like). The operating plate 64 is rotatably supported on the pivot shaft 60 and fixedly coupled to the control lever 24 such that movement of the control lever 24 about the shift pivot axis Y causes movement of the operating plate 64 about the pivot shaft 60.

The operating plate 64 is operatively coupled to both the winding mechanism 66 and the hold and release mechanism 68, which are operatively coupled to the winding member 62. Thus, upon moving the operating plate 64 in the directions W and R by the control lever 24, the winding mechanism 66 and the hold and release mechanism 68 selectively wind, hold, release and unwind the winding member 62. Rotation of the winding member 62 winds or releases the inner wire 15a (i.e., performs shifting operations). The winding or release of the inner wire 15a operates the rear derailleur 14 in a conventional manner.

The winding mechanism 66 basically includes a winding plate 72, a winding pawl 74, a first latch plate 76 and a latch pin 78. The first latch plate 76 is non-rotatably coupled to the winding member 62. The winding pawl 74 is coupled to the operating plate 64 via the latch pin 78 such that movement of the operating plate 64 in the direction W causes the winding pawl 74 to engage the winding plate 76 to rotate the winding member 62. The winding pawl 74 is biased toward an engaged position by a third spring $S_3$. The winding plate 72 is arranged to bias the operating plate back to the neutral position via a spring $S_2$. The hold and release mechanism 68 maintains the winding member 62 in the desired position.

The hold and release mechanism 68 basically includes a release plate 80, an interrupting latch 82, a positioning pawl 84, a second latch plate 86, a hold/release pin 88 and the first latch plate 76. The interrupting latch 82 and the positioning latch 84 are mounted on the hold/release pin 88. The hold/release pin 88 is mounted between an upper plate 90 and the fixed plate 70. The second latch plate 86 is non-rotatably coupled to the winding member 62. The interrupting latch 82 is arranged and configured to engage the second latch plate 86, while the positioning pawl 84 is arranged to engage the first latch plate 76. The positioning pawl 84 is biased toward an engaged position by a fourth spring $S_4$. The release plate 80 is operatively coupled between the operating plate 64 and the positioning pawl 84 to actuate the positioning pawl 84. Also, the release plate 80 biases the operating plate back to the neutral position via the biasing member $S_2$.

The parts of the winding mechanism 66 and the hold and release mechanism 68 cooperate with the operating plate 64 to selectively wind, hold and/or release the winding member 62 to control the winding/release of the inner wire 15a in a relatively conventional manner. Thus, the various parts of the shift control mechanism 32 will not be discussed and/or illustrated in further detail herein.

SECOND EMBODIMENT

Figure 14:
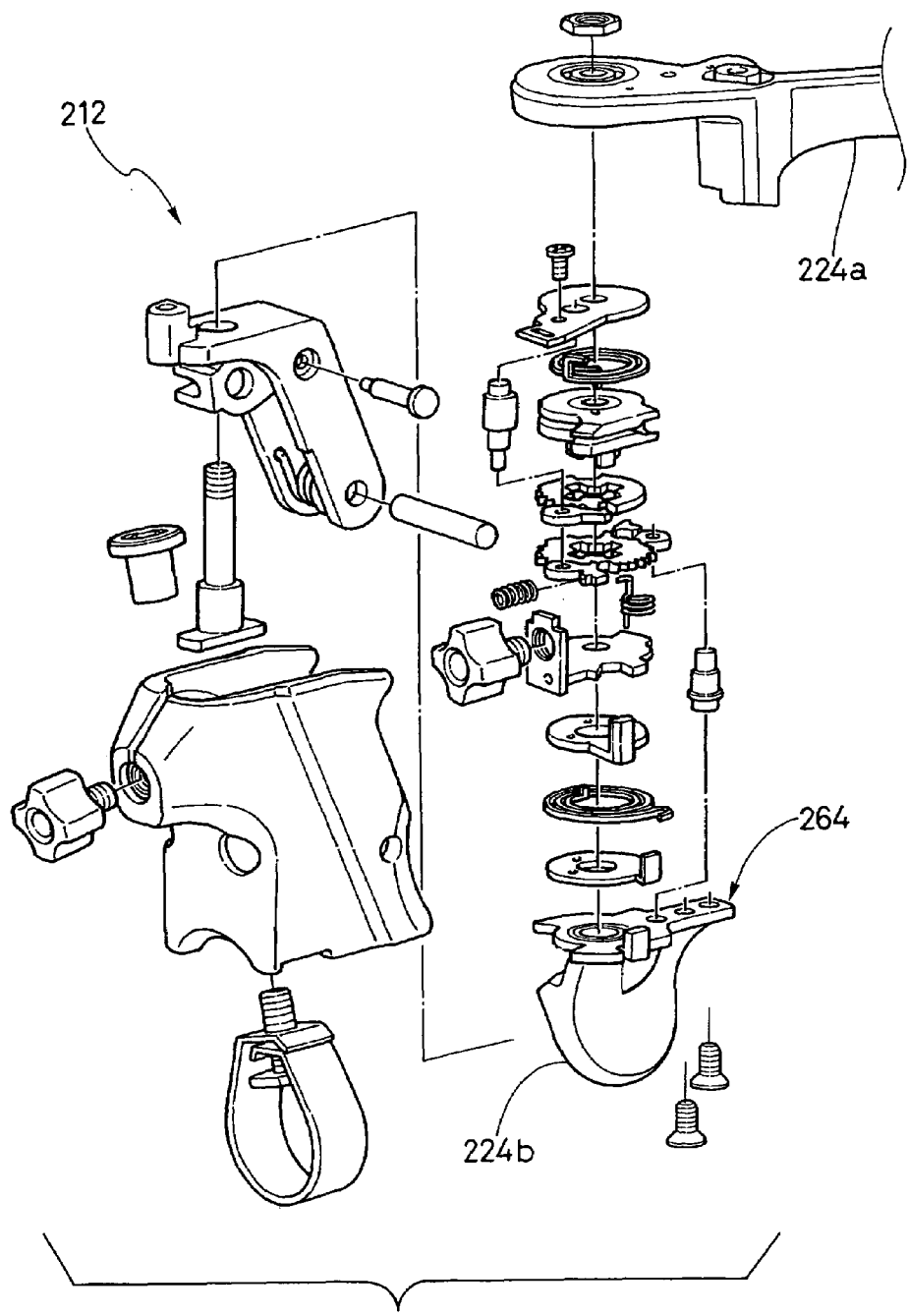
FIG. 14 is an exploded perspective view of a bicycle control device in accordance with a second embodiment of the present invention.

Referring now to FIG. 14, a bicycle control device 212 in accordance with a second embodiment will now be explained. The bicycle control device 212 of this second embodiment is identical to the bicycle control device 12 of the first embodiment, except that the control device 212 utilizes a modified second lever portion 224b that is a separate member from a modified first lever portion 224a to form a modified two-piece control lever. More specifically, the second lever portion 224b is preferably integrally formed with an operating plate 264 as a one-piece, unitary member that is separate from the first lever portion 224a, while the first lever portion 224a is absent a second lever portion (i.e., absent the second lever portion 24b of the first embodiment). Otherwise, the first and second lever portions 224a and 224b of this second embodiment are identical to the first and second lever portions 24a and 24b of the first embodiment (e.g., the orientation, location, relative sizes and functions, etc.) Similarly, the operating plate 264 is identical to the operating plate 64 of the first embodiment, except that the operating plate 264 has the second lever portion 224b integrally formed therewith.

In view of the similarity between the first and second embodiments, this second embodiment will not be discussed and/or illustrated in detail herein. Rather, it will be apparent to those skilled in the art from this disclosure that the descriptions and illustrations of the first embodiment also apply to this second embodiment, except as explained and illustrated herein. In other words, the descriptions and illustrations of the parts of the second embodiment that are identical to the parts of the first embodiment have been omitted for the sake of brevity.

THIRD EMBODIMENT

Figure 15:
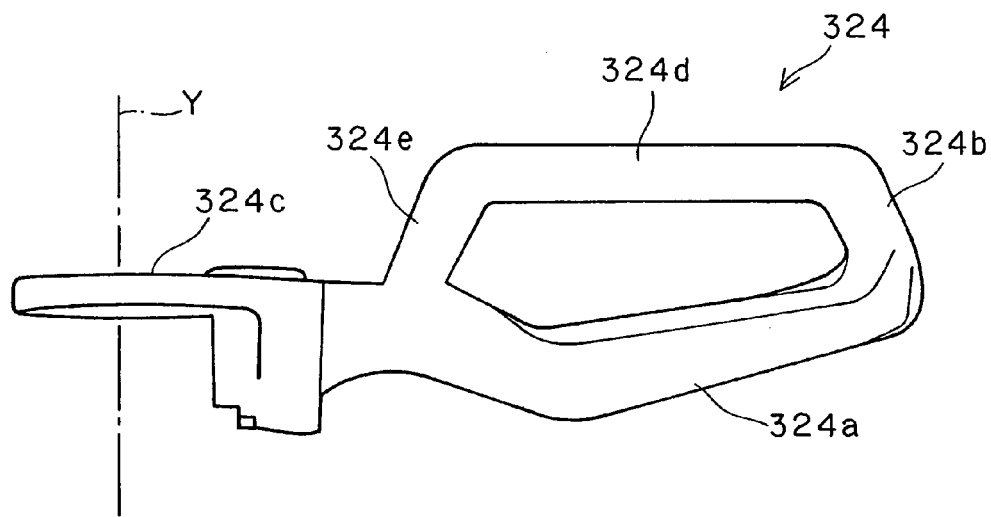
FIG. 15 is a top, plan view of a control lever in accordance with a third embodiment of the present invention.
Figure 16:
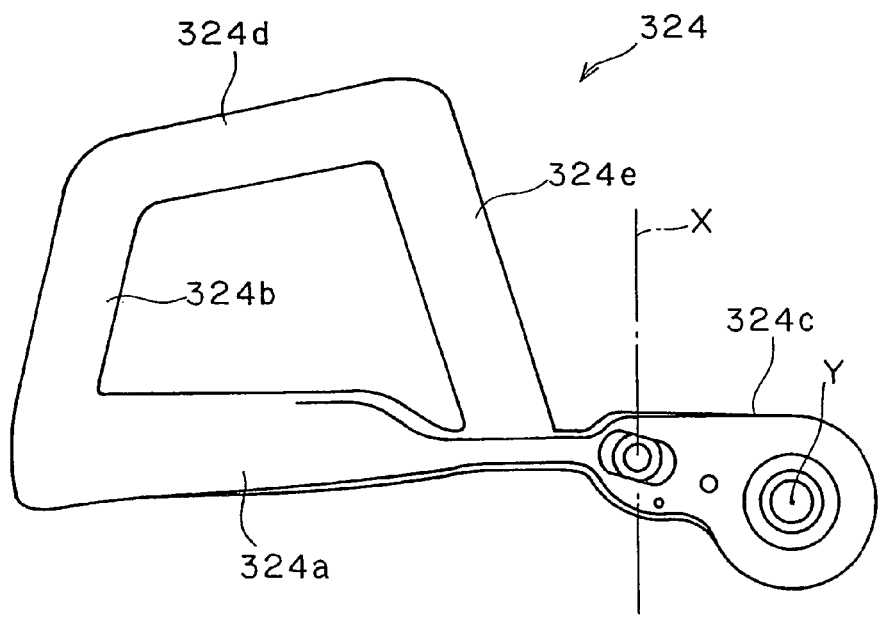
FIG. 16 is a front elevational view of the control lever illustrated in FIG. 15.

Referring now to FIGS. 15 and 16, a control lever 324 in accordance with a third embodiment of the present invention will now be explained. The control lever 324 is preferably mounted in the control device 12 of the first embodiment in place of the control lever 24. Thus, the control lever 324 is pivotal about the axes X and Y when mounted in the control device 12 in a manner substantially identical to the control lever 24 of the first embodiment.

The control lever 324 basically includes a first lever portion 324a, a second lever portion 324b, an attachment portion 324c, a third lever portion 324d and a fourth lever portion 324e. The attachment portion 324c is identical to the attachment portion 24c of the first embodiment. The first lever portion 324a is substantially identical to the first lever portion 24a of the first embodiment, except the first lever portion 324a is absent the second lever portion 24b of the first embodiment. The second lever portion 324b of this third embodiment extends upwardly and forward from a free end of the first lever portion 324a. The third lever portion 324d extends inwardly toward the center plane (not shown) of the bicycle 10. The fourth lever portion 324e connects the first lever portion 324a to the third lever portion 324d to form an annular shape. The first, second, third and fourth lever portions 324a, 324b, 324d and 324e as well as the attachment portion 324c are preferably non-movably fixed together.

While the rear derailleur 14 and the rear brake device 16 are illustrated as being cable operated components, it will be apparent to those skilled in the art from this disclosure that the present invention can be used in conjunction with bicycle components that are not cable actuated. For example, it will be apparent to those skilled in the art from this disclosure that the present invention could be modified to operate a hydraulic brake mechanism such as in U.S. Patent Publication No. US2002/0139637 assigned to Shimano, Inc. (U.S. Pat. No. 6,647,823).

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle control device comprising;
   a mounting member adapted to be coupled to a bicycle;
   a control mechanism coupled to said mounting member that is adapted to control braking and shifting;
   an attachment portion operatively coupled to said control mechanism;
   a first lever portion having a first inner end operatively coupled to said attachment portion and a first outer end longitudinally spaced from the first inner end along a first longitudinal axis, said first lever portion being arranged to perform a braking operation upon a braking movement of said first lever portion and a first shifting operation upon a first shifting movement of said first lever portion; and
   a second lever portion having a second inner end non movably fixedly coupled to said first lever portion between said attachment portion and said first outer end of said first lever portion with said second lever portion projecting outwardly relative to said first lever portion to a second outer end that is longitudinally spaced from said second inner end along a second longitudinal axis that interests said first longitudinal axis at an angle greater than zero, said second lever portion being arranged to perform a second shifting operation upon a second shifting movement of said second lever portion,
   said attachment portion and said first and second lever portions being arranged to move together when said first lever portion is operated to perform the first shifting operation and when said second lever portion is operated to perform the second shifting operation.

2. The bicycle control device according to claim 1, wherein
   said first and second lever portions being pivotally coupled relative to said mounting member about first and second pivot axes that are substantially perpendicular to each other.

3. The bicycle control device according to claim 2, wherein said first lever portion is substantially perpendicular to said first and second pivot axes.

4. The bicycle control device according to claim 2, wherein
said first pivot axis is fixed relative to said mounting member and said second pivot axis is movable relative to said mounting member when said first lever portion is moved about said first pivot axis.

5. The bicycle control device according to claim 1, wherein
said first and second lever portions are integrally formed together as a one-piece, unitary member.

6. The bicycle control device according to claim 1, wherein
said second lever portion extends outwardly from said first lever portion at an angle.

7. The bicycle control device according to claim 1, wherein
said control mechanism includes a brake control cable operatively coupled to said first lever portion.

8. The bicycle control device according to claim 7, wherein
said control mechanism includes a shift control cable operatively coupled to said first and second lever portions.

9. The bicycle control device according to claim 1, wherein
said first and second lever portions are normally biased toward a rest position from a braking position and toward a neutral position from first and second shift positions.

10. A bicycle control device comprising:
a mounting member adapted to be coupled to a bicycle;
a control mechanism coupled to said mounting member that is adapted to control braking and shifting;
a first lever portion operatively coupled to said control mechanism, said first lever portion being arranged to perform a braking operation upon a braking movement of said first lever portion and a first shifting operation upon a first shifting movement of said first lever portion; and
a second lever portion operatively coupled to said control mechanism, said second lever portion being arranged to perform a second shifting operation upon a second shifting movement of said second lever portion,
said first and second lever portions being constructed as separate members from each other that are non-movably fixed to each other and being arranged to move together when said first lever portion is operated to perform the first shifting operation and when said second lever portion is operated to perform the second shifting operation.

11. The bicycle control device according to claim 10, wherein
said control mechanism includes an operating plate that is fixedly coupled to said first lever portion, said second lever portion and said operating plate being integrally formed together as a one-piece, unitary member.

12. A bicycle control device comprising:
a mounting member adapted to be coupled to a bicycle;
a control mechanism coupled to said mounting member that is adapted to control braking and shifting;
a first lever portion operatively coupled to said control mechanism, said first lever portion being arranged to perform a braking operation upon a braking movement of said first lever portion and a first shifting operation upon a first shifting movement of said first lever portion;
a second lever portion operatively coupled to said control mechanism and extending outwardly from said first lever portion at an angle, said second lever portion being arranged to perform a second shifting operation upon a second shifting movement of said second lever portion; and
a third lever portion extending at an angle to said second lever portion and a fourth lever portion connecting said third lever portion to said first lever portion to form a substantially annular shape together with said first and second lever portions.

13. The bicycle control device according to claim 12, wherein said first, second, third and fourth lever portions are non-movably fixed to each other.

14. The bicycle control device according to claim 12, wherein
said second lever portion extends substantially forward and upward from an outer end of said first lever portion when said bicycle control device is coupled to the bicycle and the bicycle is in a normal riding position.

15. The bicycle control device according to claim 14, wherein
said third lever portion extends substantially inwardly from said second lever portion toward a center plane of the bicycle.

16. A bicycle control device comprising:
a mounting member adapted to be coupled to a bicycle;
a control mechanism coupled to said mounting member that is adapted to control braking and shifting;
a first lever portion operatively coupled to said control mechanism, said first lever portion being arranged to perform a braking operation upon a braking movement of said first lever portion and a first shifting operation upon a first shifting movement of said first lever portion; and
a second lever portion operatively coupled to said control mechanism and protruding substantially forward and upward from said first lever portion when said bicycle control device is coupled to the bicycle and the bicycle is in a normal riding position, said second lever portion being arranged to perform a second shifting operation upon a second shifting movement of said second lever portion,
said first and second lever portions being arranged to move together when said first lever portion is operated to perform the first shifting operation and when said second lever portion is operated to perform the second shifting operation.

17. A bicycle control device comprising:
a mounting member adapted to be coupled to a bicycle;
a control mechanism coupled to said mounting member that is adapted to control braking and shifting;
a first lever portion operatively coupled to said control mechanism, said first lever portion being arranged to perform a braking operation upon a braking movement of said first lever portion and a first shifting operation upon a first shifting movement of said first lever portion; and
a second lever portion operatively coupled to said control mechanism and protruding substantially downwardly and rearwardly relative to said first lever portion when said bicycle control device is coupled to the bicycle and the bicycle is in a normal riding position, said second lever portion being arranged to perform a second shifting operation upon a second shifting movement of said second lever portion, said first and second lever portions being arranged to move together when said first lever portion is operated to perform the first shifting operation and when said second lever portion is operated to perform the second shifting operation.

18. The bicycle control device according to claim 17, wherein said first lever portion includes a free end located outwardly of the second lever portion when said bicycle control device is coupled to the bicycle and the bicycle is in the normal riding position.

* * * * *